United States Patent
Zhao et al.

(10) Patent No.: US 12,061,087 B2
(45) Date of Patent: Aug. 13, 2024

(54) STRAPDOWN INERTIAL NAVIGATION HEAVE MEASUREMENT METHOD USING MULTIPLE LOW-PASS FILTER UNITS

(71) Applicant: Harbin Engineering University, Harbin (CN)

(72) Inventors: Yuxin Zhao, Harbin (CN); Tingxiao Wei, Harbin (CN); Yueyang Ben, Harbin (CN); Lei Wu, Harbin (CN); Qian Li, Harbin (CN); Guangtao Zhou, Harbin (CN); Qianqian Gao, Harbin (CN); Xiaofeng Wei, Harbin (CN); Shuaiyang Li, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 191 days.

(21) Appl. No.: 17/846,128

(22) Filed: Jun. 22, 2022

(65) Prior Publication Data
US 2022/0326019 A1    Oct. 13, 2022

Related U.S. Application Data

(63) Continuation of application No. PCT/CN2022/087806, filed on Apr. 20, 2022.

(30) Foreign Application Priority Data

Apr. 21, 2021    (CN) .......................... 202110428787.1

(51) Int. Cl.
G01C 21/20    (2006.01)
G01C 21/16    (2006.01)

(52) U.S. Cl.
CPC ........... *G01C 21/203* (2013.01); *G01C 21/16* (2013.01)

(58) Field of Classification Search
None
See application file for complete search history.

(56) References Cited

U.S. PATENT DOCUMENTS

| 2019/0361457 A1* | 11/2019 | Johnson | G05D 1/0044 |
| 2021/0173413 A1* | 6/2021 | Derginer | G05D 1/0875 |
| 2022/0223054 A1* | 7/2022 | Keyes | B64F 5/60 |

FOREIGN PATENT DOCUMENTS

| CN | 105698789 A | 6/2016 |
| CN | 110319838 A | 10/2019 |

(Continued)

OTHER PUBLICATIONS

Liu, Xixiang et. al. "a Calculation Method for Ship Heave Motion Based on Inertial Measurement and Adaptive Filter" Journal of Chinese Inertial Technology, V27 No. 1, Feb. 28, 2019.

(Continued)

*Primary Examiner* — Patrick Assouad
*Assistant Examiner* — Mark A Shabman
(74) *Attorney, Agent, or Firm* — IPRO, PLLC

(57) ABSTRACT

A strapdown inertial navigation heave measurement method using multiple low-pass filter units includes: firstly, collecting data of a gyroscope and an accelerometer by a system, obtaining attitude information of a carrier by using initial alignment, and then, obtaining a relationship matrix between a body coordinate system and a geographic coordinate system by using the attitude information; obtaining a relationship matrix between the geographic coordinate system and a reference coordinate system according to a geographic position, and obtaining a rough vertical acceleration by using a direction cosine matrix, output information of the accelerometer and gravity information; then, filtering out low-frequency signals by using a first filter unit and integration to obtain a relatively accurate velocity signal; and (Continued)

furthermore, enabling the vertical acceleration to be subjected to a second filter unit and integration to obtain an accurate heave displacement.

3 Claims, 3 Drawing Sheets

(56) References Cited

FOREIGN PATENT DOCUMENTS

| | | |
|---|---|---|
| CN | 113175943 A | 7/2021 |
| JP | H10132565 A | 5/1998 |

OTHER PUBLICATIONS

Huang, Rong "Research on calculation method of ship heave motion based on inertial measurement and digital filtering" China's Thesis Database (Eng. Sci II) of Excellence. vol. 6, Jun. 15, 2020.
Yan, Gongmin et. al. "Measurement of ship's heave motion based on INS and zero-phase-delay digital filter" Journal of Navigation and Positioning, vol. 4 No. 2 Jun. 30, 2016.

* cited by examiner

STRAPDOWN INERTIAL NAVIGATION HEAVE MEASUREMENT METHOD USING MULTIPLE LOW-PASS FILTER UNITS

TECHNICAL FIELD

The disclosure relates to a strapdown inertial navigation heave measurement method, in particular to a strapdown inertial navigation heave measurement method using multiple low-pass filter units, and belongs to the technical field of ship motion measurement.

BACKGROUND

In the field of maritime navigation, the accuracy of navigation is a very important field. Due to complex sea conditions, a carrier will have problems about stability and safety at sea. Inertial navigation is a main navigation system for maritime navigation. An inertial navigation system will provide attitude, velocity and position information to an operator. Affected by sea wind and waves, the maritime carrier will have linear and angular motions along horizontal, longitudinal and vertical axes. The above motions of six degrees of freedom will affect the navigation accuracy, but the vertical motion of the ship along the earth surface will affect some maritime operations, such as the take-off and landing of carrier-based aircrafts, the launching of carrier-based artillery shells, and the operation of jack-up oil drilling platforms. Therefore, the real-time and accurate measurement of the heave motion of the maritime carrier has very important research value.

In the current navigation field, GPS integrated navigation belongs to a navigation method with very high accuracy and wide application. However, the navigation ability for a vertical motion is not ideal. Moreover, the sea heave displacement of a ship hull is often very small. Therefore, other methods are required for measuring the heave motion of the ship hull.

Current heave measurement technologies mainly include a damping network technology, a Kalman filter technology and a digital filter technology, wherein the digital filter technology is the most commonly used technology in heave measurement. Generally, a high-pass filter is added to filter out a low-frequency Schuler period term in a heave acceleration. However, the addition of the high-pass filter will cause problems such as phase delay and amplitude attenuation, which introduces new errors while eliminating harmful low-frequency components in the acceleration. Aiming at the problems, someone proposed a method of adding an all-pass filter to compensate for a phase, such as patent 201910176342.1. In patent 201910612677.3, a fast Fourier transform (FFT) adaptive algorithm is provided to estimate a dominant frequency of waves, which is used for the design of parameters of the all-pass filter. However, this method requires additional filters to be added, which may introduce a new error amount.

SUMMARY

In view of the technical problem in the above prior art, the disclosure aims to provide a strapdown inertial navigation heave measurement method using multiple low-pass filter units, so as to ameliorate the problem of phase errors caused by traditional high-pass digital filters.

In order to solve the above technical problem, a strapdown inertial navigation heave measurement method using multiple low-pass filter units in the disclosure includes the following steps:

step 1: fully preheating a motion attitude reference system, and collecting output signals of a gyroscope and an accelerometer on three axes of a body coordinate system (b system) in real time;

step 2: measuring real-time attitude information of a ship, including a pitch angle $\theta$, a roll angle $\gamma$ and a yaw angle $\varphi$ of the body coordinate system relative to a navigation coordinate system (n system), by using the output signal of the gyroscope, so as to obtain an attitude matrix $C_b^n$;

step 3: calculating an acceleration $\dot{v}^n$ of the ship according to a sensitive acceleration signal of the accelerometer by using a navigation solution method;

step 4: converting the $\dot{v}^n$ to a semi-fixed coordinate system by using a direction cosine matrix $C_n^d$ between the navigation system (n system) and a semi-fixed coordinate system (d system), so as to obtain $\dot{v}^d$;

step 5: extracting a z-axis component $\dot{v}_z^d$ of the $\dot{v}^d$ obtained in step 4 in a vertical direction of the d system;

step 6: enabling the $\dot{v}_z^d$ to be subjected to a double-filter unit and an integral link to obtain a heave velocity $v_z^d$; and step 7: enabling the $\dot{v}_z^d$ to be subjected to a triple-filter unit and two integral links to obtain a heave displacement $p_z^d$.

The disclosure further includes the followings:

1. A transfer function $G_v(s)$ of the double-filter unit in step 6 is:

$$G_v(s) = \frac{s^4 + 4\zeta\Omega_p s^2 + 4\zeta^2\Omega_p^2}{(s^2 + 2\zeta\Omega_p s + \Omega_p^2)^2},$$

where $\zeta$ represents a damping coefficient, and $\Omega_p$ represents a passband cutoff frequency.

2. A transfer function $G_p(s)$ of the triple-filter unit in step 7 is:

$$G_p(s) = \frac{(s^2 + 2\zeta\Omega_p s)^3}{(s^2 + 2\zeta\Omega_p s + \Omega_p^2)^3},$$

where $\zeta$ represents a damping coefficient, and $\Omega_p$ represents a passband cutoff frequency.

The disclosure has the following beneficial effects: The idea of the disclosure is that a result obtained by subtracting the signal passing through a low-pass filter from an original signal is used as an output to realize the filtering-out of low-frequency harmful components. The disclosure has two output interfaces of high-accuracy heave velocity and heave displacement. Furthermore, the method also has the following advantages: Firstly, only one low-pass filter which is simple in principle and requires less calculation is introduced into the system, so the cost is also lower. Secondly, since the phase error caused by the low-pass filter is very small and negligible, there is no need to introduce an additional filter to compensate for the phase error. Moreover, the disclosure also has very high measurement accuracy. In an experiment, an error of the method is within 3 cm, which meets an index of a heave error of 5 cm.

Firstly, the method may directly provide two output interfaces of velocity and displacement, and may perform multiple navigation works at the same time.

Secondly, a core part of the method is a low-pass filter, so the phase error introduced by the filter is very small and negligible, and there is no need to provide additional filters to compensate for the phase, so as to avoid other errors and uncertain factors that may be caused by introducing additional parts.

Thirdly, since a wave frequency range under natural conditions is known and is quite different from a low-frequency part that needs to be filtered out, filter parameters may be designed directly according to the known wave frequency range without additionally providing a wave frequency detection module.

DETAILED DESCRIPTION

Figure 1:
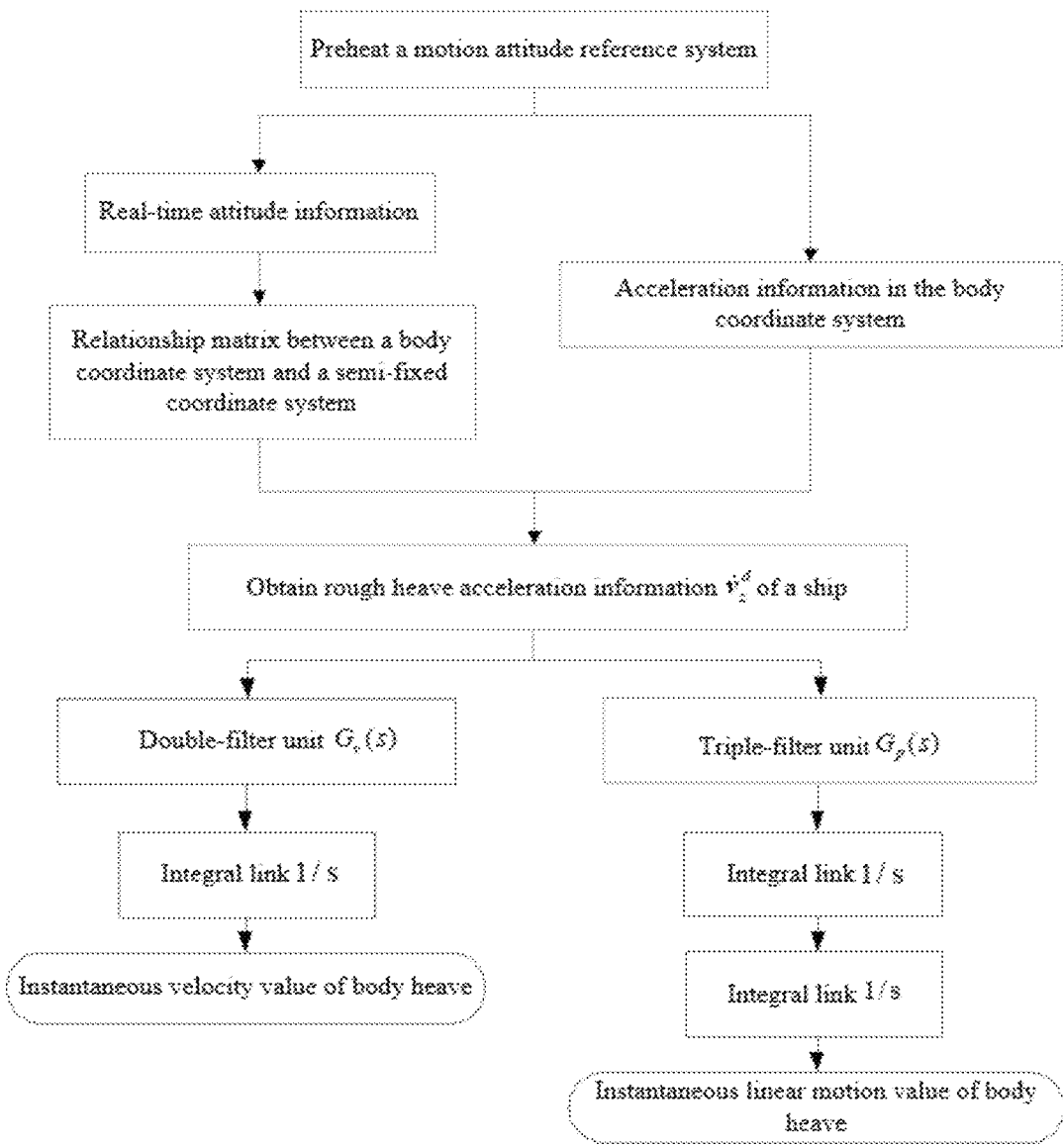
FIG. 1 shows a flow chart for implementing the disclosure.

The disclosure will be further described below with reference to the accompanying drawings of the specification and specific implementations.

In the disclosure, firstly, data of a gyroscope and an accelerometer are collected by a system. Attitude information of a carrier is obtained by initial alignment. Then, an attitude matrix between a body coordinate system and a navigation coordinate system is obtained by using the attitude information. A direction cosine matrix between the navigation coordinate system and a semi-fixed coordinate system is obtained according to a geographic position. A rough vertical acceleration is obtained by using the direction cosine matrix, output information of the accelerometer and gravity information. Then, low-frequency signals are filtered out by a double-filter unit and one integral link to obtain a relatively accurate velocity signal. Furthermore, the vertical acceleration is subjected to a triple-filter unit and two integral links to obtain an accurate heave displacement. The method avoids the problem of phase lead caused by traditional addition of high-pass filters, and can provide a reference for ship swaying reduction operations, ship carrier lifts, ship-borne weapon launch and heave compensation of various offshore platforms. The method mainly includes the following steps:

Step 1: A motion attitude reference system is fully preheated, and output signals of a gyroscope and an accelerometer on three axes of a body coordinate system are collected in real time.

Step 2: Real-time attitude information of a ship is measured by using the output signal of the gyroscope, so as to obtain an attitude matrix $C_b^n$.

Step 3: An acceleration $\dot{v}^n$ of the ship is obtained by the attitude matrix $C_b^n$, where $$C_b^n = \begin{bmatrix} C_{11} & C_{12} & C_{13} \\ C_{21} & C_{22} & C_{23} \\ C_{31} & C_{32} & C_{33} \end{bmatrix},$$

$C_{11}=\cos\gamma\cos\varphi+\sin\gamma\sin\varphi\sin\theta$,
$C_{12}=\sin\varphi\cos\theta$,
$C_{13}=\sin\gamma\cos\varphi-\cos\gamma\sin\varphi\sin\theta$,
$C_{21}=\cos\gamma\sin\varphi+\sin\gamma\cos\varphi\sin\theta$,
$C_{22}=\cos\varphi\cos\theta$,
$C_{23}=-\sin\gamma\sin\varphi+\cos\gamma\cos\varphi\sin\theta$,
$C_{31}=-\sin\gamma\cos\theta$,
$C_{32}=\sin\theta$,
$C_{33}=\cos\gamma\cos\theta$, where $\theta$, $\gamma$, $\varphi$ respectively represent a pitch angle, a roll angle and a yaw angle of the ship.

Step 4: The $\dot{v}^n$ is converted to a d system by using a direction cosine matrix $C_n^d$ between a navigation system (n system) and a semi-fixed coordinate system (d system), so as to obtain $\dot{v}^d$, where $$C_n^d = \begin{bmatrix} \cos\psi & \sin\psi & 0 \\ -\sin\psi & \cos\psi & 0 \\ 0 & 0 & 1 \end{bmatrix},$$

where $\psi$ represents a main heading angle of the ship.

Step 5: A z-axis component $\dot{v}_z^d$ of the $\dot{v}^d$ obtained in step 4 in a vertical direction of the d system is extracted.

Step 6: The $\dot{v}_z^d$ is subjected to a double-filter unit and an integral link to obtain a relatively accurate heave velocity $\dot{v}_z^d$, where a transfer function of the integral link is $G(s)=1/s$, and a transfer function $G_v(s)$ of the double-filter unit is:

$$G_v(s) = \frac{s^4 + 4\zeta\Omega_p s^2 + 4\zeta^2\Omega_p^2}{(s^2 + 2\zeta\Omega_p s + \Omega_p^2)^2},$$

where $\zeta$ represents a damping coefficient and is generally 0.707, and $\Omega_p$ represents a passband cutoff frequency.

Step 7: The $\dot{v}_z^d$ is subjected to a triple-filter unit and two integral links to obtain an accurate heave displacement $p_z^d$, where a transfer function $G_p(s)$ of the triple-filter unit is:

$$G_p(s) = \frac{(s^2 + 2\zeta\Omega_p s)^3}{(s^2 + 2\zeta\Omega_p s + \Omega_p^2)^3}.$$

With reference to FIG. 1, the disclosure includes the following steps:

Step 1: A motion attitude reference system is fully preheated, and output signals of a gyroscope and an accelerometer on three axes of a body coordinate system b are collected in real time.

Step 2: Real-time attitude information of a ship, including a pitch angle $\theta$, a roll angle $\gamma$ and a yaw angle $\varphi$, is measured by using the output signal of the gyroscope.

Step 3: A direction cosine matrix $C_b^n$ between the body coordinate system (b system) and a navigation system (n system) is calculated according to the attitude information, where an expression of the direction cosine matrix $C_b^n$ is:

$$C_b^n = \begin{bmatrix} C_{11} & C_{12} & C_{13} \\ C_{21} & C_{22} & C_{23} \\ C_{31} & C_{32} & C_{33} \end{bmatrix},$$

where
$C_{11}=\cos\gamma\cos\varphi+\sin\gamma\sin\varphi\sin\theta$,
$C_{12}=\sin\varphi\cos\theta$,
$C_{13}=\sin\gamma\cos\varphi-\cos\gamma\sin\varphi\sin\theta$,
$C_{21}=-\cos\gamma\sin\varphi+\sin\gamma\cos\varphi\sin\theta$,
$C_{22}=\cos\varphi\cos\theta$,
$C_{23}=-\sin\gamma\sin\varphi+\cos\gamma\cos\varphi\sin\theta$, $C_{31}$=— sin γ cos
$C_{32}$=sin θ,
$C_{33}$ cos γ cos θ, Step 4: An acceleration $\dot{v}^n$ of the ship is calculated by collecting the data of a sensor installed at the center of gravity of a ship hull in real time by a navigation solution method, and the acceleration of the ship is calculated by a sensitive acceleration signal of the accelerometer through the following formula:

$$\dot{v}^n = C_b^n f_{sf}^b - (2\omega_{ie}^n + \omega_{en}^n) \times v^n + g^n,$$

where $\dot{v}^n$ represents an acceleration of the ship, $C_b^n f_{sf}^b$ represents a specific force in an up direction obtained after coordinate transformation of a proportional vector of the ship by a ship attitude array obtained by a strapdown inertial navigation system, $\omega_{ie}^n$ represents a Coriolis compensation term, $\omega_{en}^n$ represents a rotational angular velocity of the earth, $v^n$ represents a navigation velocity of the ship, $g^n$ represents a gravitational acceleration of a local ship. In a non-navigation state of the ship, the second term in the formula is 0. That is, $\dot{v}^n = C_b^n f_{sf}^b + g^n$.

Step 5: A direction cosine matrix $C_n^d$ between then system and the semi-fixed coordinate system (d system) is obtained according to an included angle between a geographic north direction and a track of the ship at an instantaneous state during navigation and control, that is, a main heading angle ψ of the ship. A specific expression is:

$$C_n^d = \begin{bmatrix} \cos\psi & \sin\psi & 0 \\ -\sin\psi & \cos\psi & 0 \\ 0 & 0 & 1 \end{bmatrix}.$$

Step 6: The $\dot{v}^n$ is converted to the d system by the direction cosine matrix $C_n^d$ obtained in step 5 to obtain $\dot{v}^d$. A specific calculation formula is as follows:

$$\dot{v}^d = C_n^d (C_b^n f_{sf}^b + g^n) = C_b^d f_{sf}^b + g^d,$$

where $g^d$ represents a projection of the gravitational acceleration at the location of a carrier on the d system.

Step 7: A projection $\dot{v}_z^d$ of the acceleration $\dot{v}^d$ on a vertical axis z of the d system is extracted.

Step 8: The $\dot{v}_z^d$ is subjected to a double-filter unit and one integral link to obtain a relatively accurate heave velocity $v_z^d$, where a transfer function of the integral link is $G(s)=1/s$, and a transfer function $G_v(s)$ of the double-filter unit is:

$$G_v(s) = \frac{s^4 + 4\zeta\Omega_p s^2 + 4\zeta^2\Omega_p^2}{(s^2 + 2\zeta\Omega_p s + \Omega_p^2)^2},$$

where ζ represents a damping coefficient and is generally 0.707, and $\Omega_p$ represents a passband cutoff frequency.

Step 9: According to an ocean frequency range of 0.04-0.2 Hz at a high-frequency part and a Schuler period frequency range of 0~1.97470×10⁻⁴ Hz at a low-frequency band, and based on the principle of increasing the passband accuracy as much as possible, a passband cutoff frequency $\Omega_p$ may be calculated.

Step 10: A bilinear transformation method in a z transform is used for converting the above-mentioned analog filter into a digital filter under discrete signals.

Step 11: The $\dot{v}_z^d$ is subjected to a triple-filter unit and two integral links to obtain a relatively accurate heave displacement $p_z^d$, where a transfer function $G_p(s)$ of the triple-filter unit is:

$$G_p(s) = \frac{(s^2 + 2\zeta\Omega_p s)^3}{(s^2 + 2\zeta\Omega_p s + \Omega_p^2)^3}.$$

Thus, the heave information of the ship, including a heave velocity and a heave displacement, is obtained.

The disclosure realizes the filtering of heave information without a phase delay, and simplifies a filter model of traditional heave information. The disclosure can be used in many aspects such as the take-off and landing of carrier-based aircrafts, the launching of carrier-borne weapons, and the design of heave compensation devices for drilling platforms.

Figure 2:
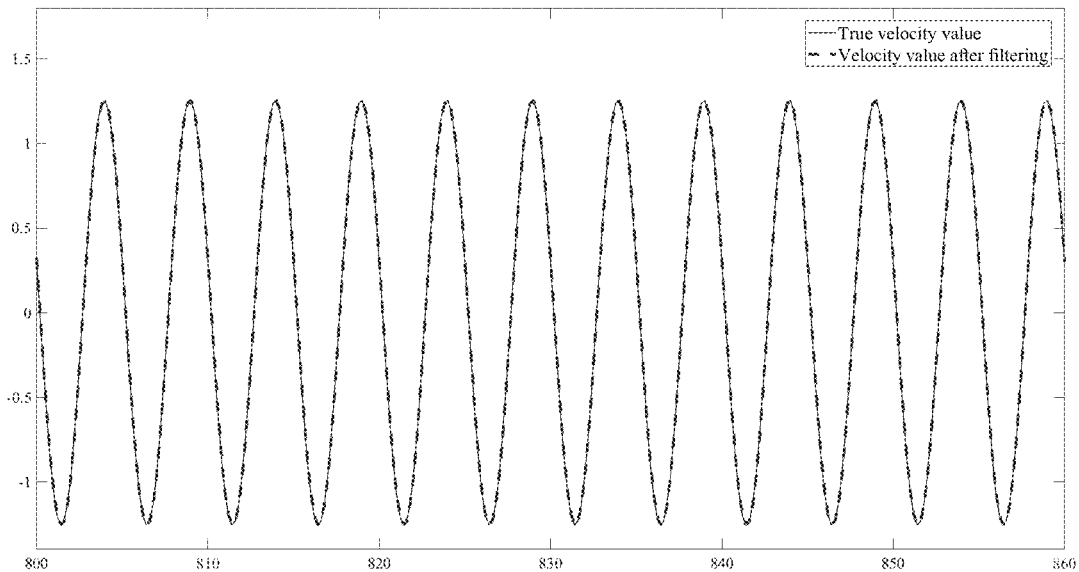
FIG. 2 shows a comparison chart of a heave velocity and a true velocity.
Figure 3:
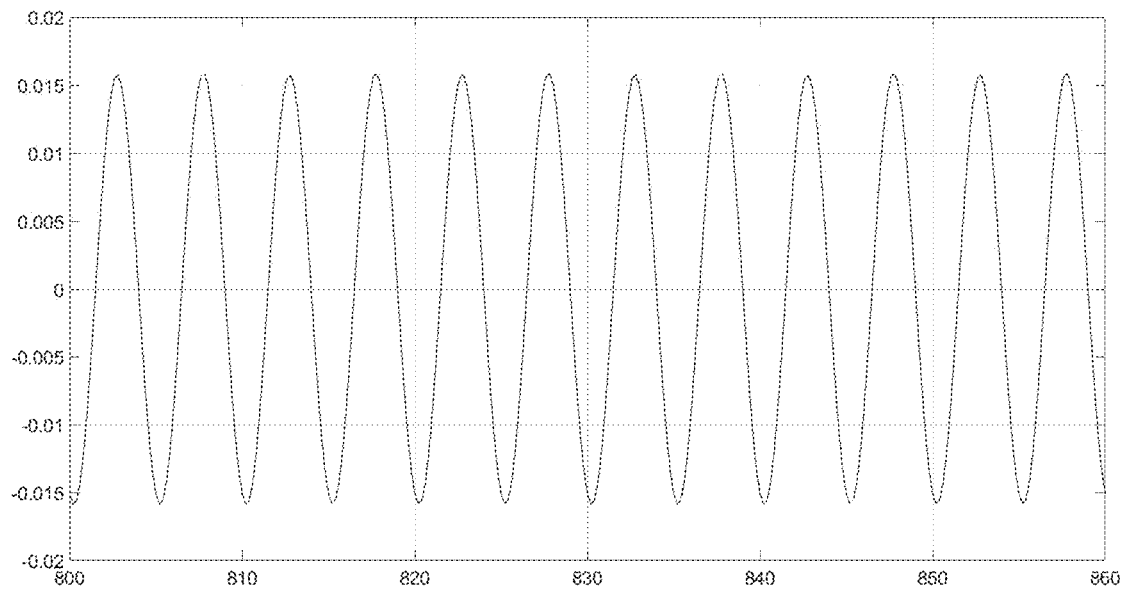
FIG. 3 shows a heave velocity error.
Figure 4:
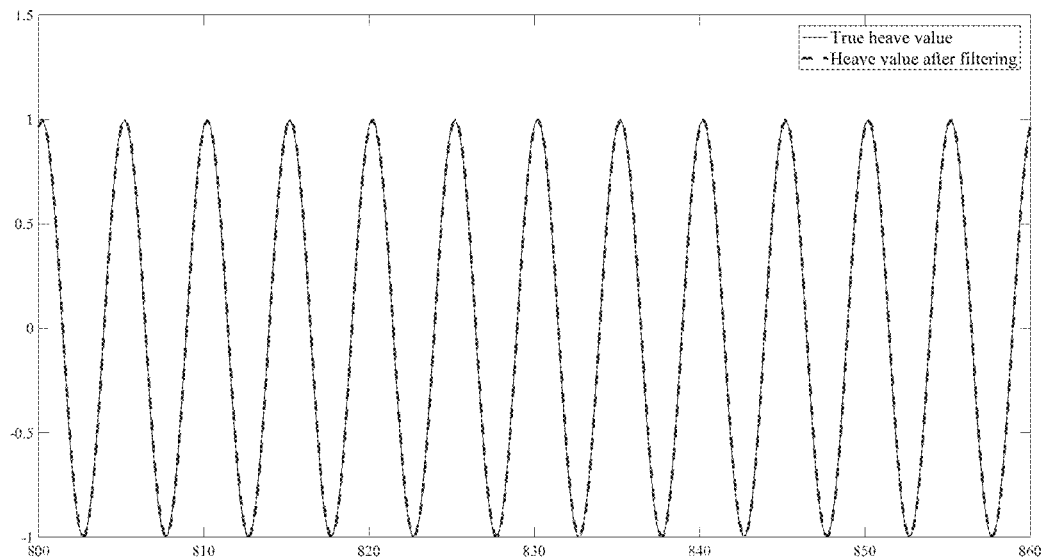
FIG. 4 shows a comparison chart of a heave displacement and a true displacement.
Figure 5:
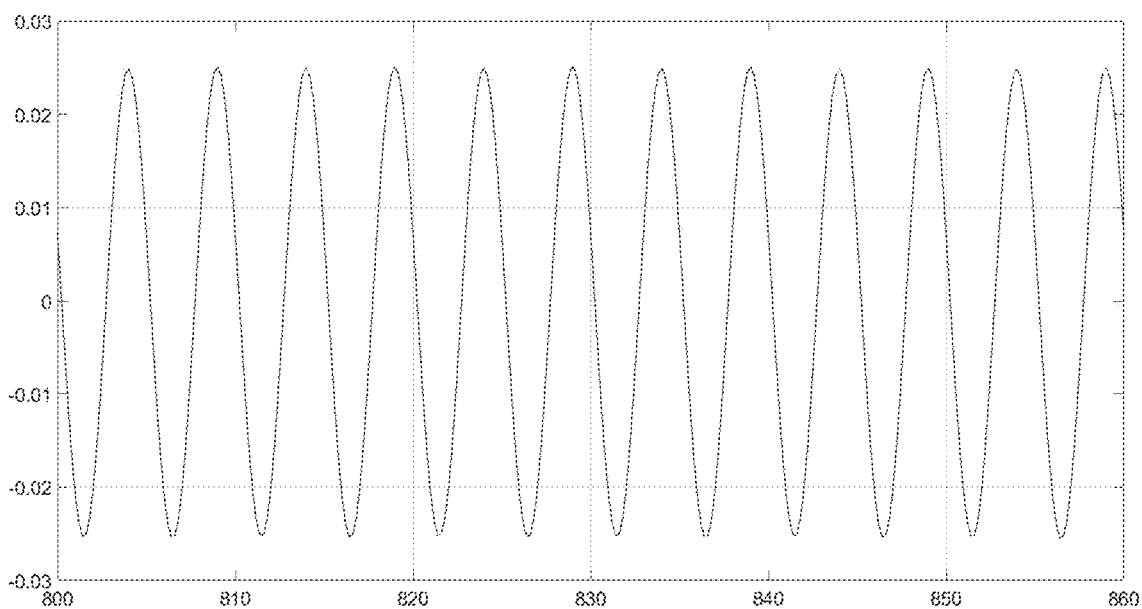
FIG. 5 shows a heave displacement error.

The strapdown inertial navigation heave measurement method based on multiple filter units in the disclosure can realize the filtering of heave information without a phase delay, and can be used in many conventional maritime operations, such as the launching of carrier-borne weapons, submarine diving and many other aspects. FIG. 1 shows a flow chart of the disclosure. Moreover, in order to verify the feasibility of the method, the disclosure provides solution simulation results of heave information at a sampling frequency of 100 Hz, as shown in FIG. 2 to FIG. 5. FIG. 2 and FIG. 3 show comparison charts between a heave velocity and a true value after the processing by a double-filter unit and one integral link. FIG. 3 shows an error signal between the heave velocity and the true value. FIG. 4 shows a comparison chart between a heave displacement and a true value after the processing by a triple-filter unit and two integral links. FIG. 5 shows an error signal between the heave displacement and the true value. As can be seen from FIG. 2 to FIG. 5, there is almost no phase delay between a multi-filter unit algorithm and a heave velocity and displacement curve of a traditional bidirectional filter. Furthermore, the absolute value of a displacement amplitude error is basically within 3 cm, which meets an index requirement of 5% heave error.

What is claimed is:

1. A strapdown inertial navigation heave measurement method, comprising the following steps:
    step 1: fully warming up a motion attitude reference system, and collecting output signals of a gyroscope and an accelerometer on three axes of a body coordinate system b in real time;
    step 2: measuring real-time attitude information of a ship, comprising a pitch angle θ, a roll angle γ and a yaw angle φ of the body coordinate system relative to a navigation coordinate system (n system), by using the output signal of the gyroscope, so as to obtain an attitude matrix $C_b^n$;
    step 3: calculating an acceleration $\dot{v}^n$ of the ship according to an acceleration signal of the accelerometer;
    step 4: converting the acceleration $\dot{v}^n$ to a reference coordinate system by using a direction cosine matrix $C_n^d$ between the navigation system (n system) and the reference coordinate system (d system), so as to obtain an acceleration $\dot{v}^d$ of the ship in the d system;
    step 5: extracting a z-axis component $\dot{v}_z^d$ of the acceleration $\dot{v}^d$ obtained in step 4 in a vertical direction of the d system;
    step 6: using a first filter unit on and integrating the z-axis component $\dot{v}_z^d$ to obtain a heave velocity $v_z^d$; and step 7: using a second filter unit on and integrating the z-axis component $\dot{v}_z^d$ to obtain a heave displacement $p_z^d$.

2. The strapdown inertial navigation heave measurement method according to claim 1, wherein a transfer function $G_v(s)$ of the first filter unit in step 6 is:

$$G_v(s) = \frac{s^4 + 4\zeta\Omega_p s^2 + 4\zeta^2\Omega_p^2}{\left(s^2 + 2\zeta\Omega_p s + \Omega_p^2\right)^2},$$

wherein $\zeta$ represents a damping coefficient, and $\Omega_p$ represents a passband cutoff frequency.

3. The strapdown inertial navigation heave measurement method according to claim 1, wherein a transfer function $G_p(s)$ of the second filter unit in step 7 is:

$$G_p(s) = \frac{\left(s^2 + 2\zeta\Omega_p s\right)^3}{\left(s^2 + 2\zeta\Omega_p s + \Omega_p^2\right)^3},$$

wherein $\zeta$ represents a damping coefficient, and $\Omega_p$ represents a passband cutoff frequency.

\* \* \* \* \*